United States Patent [19]

Martinez et al.

[11] 4,382,984

[45] May 10, 1983

[54] STABLE AQUEOUS POLY-(HYDROXYMETHYL METHACRYLATE) DISPERSIONS AND COATING COMPOSITIONS CONTAINING SAME

[75] Inventors: Carlos J. Martinez, Edison; Michael A. Tobias, Bridgewater, both of N.J.

[73] Assignee: Mobil Oil Corporation, New York, N.Y.

[21] Appl. No.: 221,699

[22] Filed: Dec. 31, 1980

[51] Int. Cl.³ .............................................. B05D 3/02
[52] U.S. Cl. .................................... 427/391; 427/393; 427/393.5; 526/320
[58] Field of Search ................. 427/391, 393.5, 385.5; 260/29.6 H, 29.4 UA, 29.6 NR; 526/320

[56] References Cited

U.S. PATENT DOCUMENTS 3,948,841  4/1976  Dusek .......................... 260/29.6 TA
4,118,355  10/1978  Vorchheimer ............ 260/29.6 H X
4,136,075  1/1979  Finn et al. ................... 260/29.6 TA
4,170,582  10/1979  Mori et al. ................. 260/29.6 RW

FOREIGN PATENT DOCUMENTS 46-41457  12/1971  Japan .
46-41472  12/1971  Japan .

Primary Examiner—Michael R. Lusignan
Attorney, Agent, or Firm—Charles A. Huggett; Michael G. Gilman; Edward J. Trojnar

[57] ABSTRACT

Stable water dispersions of relatively low molecular weight poly-(hydroxyethyl methacrylate) and thermosetting coating compositions thereof with aminoplast cross-linking agents are disclosed. These coating compositions are particularly suitable for heat sensitive substrates such as hardboard, plywood plastics and paper since they are capable of rapid cure at low temperatures.

10 Claims, No Drawings

STABLE AQUEOUS POLY-(HYDROXYMETHYL METHACRYLATE) DISPERSIONS AND COATING COMPOSITIONS CONTAINING SAME

BRIEF DESCRIPTION OF THE INVENTION

This invention relates to stable water dispersions of relatively low molecular weight poly-(hydroxyethyl methacrylate) and thermosetting coating compositions thereof with aminoplast cross-linking agents. These coating compositions are particularly suitable for heat sensitive substrates such as hardboard, plywood plastics and paper since they are capable of rapid cure at low temperatures.

DETAILED DESCRIPTION OF THE INVENTION

Stable water dispersions of low molecular weight poly-(hydroxyethyl methacrylate) with a solids content high enough and a viscosity low enough for use in cross-linked coatings, are difficult to obtain.

In accordance with this invention it has been found that hydroxyethyl methacrylate can be polymerized under certain conditions to achieve stable dispersions in an aqueous solvent mixture comprising water and a water-miscible lower alkanol. The solids content of the dispersions of poly-(hydroxethyl methacrylate) is at least 15 weight percent and up to over 30 weight percent with a viscosity suitable for coatings applications.

Poly-(hydroxyethyl methacrylate) can be polymerized in accordance with this invention to achieve relatively low molecular weight products with desirable viscosity by the use of a persulfate polymerization catalyst e.g., ammonium persulfate in the presence of a higher alkyl mercaptan chain transfer agent e.g., n-octyl mercaptan. Polymerization is preferably conducted in an aqueous solvent mixture consisting essentially of water and a water miscible lower alkanol.

Preferably, the water content of the aqueous solvent mixture is at least 40 weight percent and the alkanol content is at least 30 weight percent. Suitable lower alkanols are methanol, ethanol and isopropanol. A particular mixture found to be suitable comprises 50 weight percent water and 50 weight percent methanol.

The poly-(hydroxyethyl methacrylate) compositions of this invention are particularly suitable as components in low temperature curable, water reducible coating compositions containing cross-linking agents such as aminoplast resins. Melamine-formaldehyde and urea-formaldehyde condensates may be mentioned as curing agents.

The proportions of poly-(hydroxyethyl methacrylate) to curing agent can vary widely depending on the coating characteristics desired and the nature of the curing agent used. Generally, the proportions of poly-(hydroxyethyl methylacrylate) and curing agent fall within the range of 1:2 to 2:1 on a dry solids weight basis. It is beneficial to include an acid curing catalyst to facilitate curing. Strong organic acids such as para-toluene sulfonic acid and methane sulfonic acid are considered especially suitable. The amount of acid catalyst used also can vary considerably depending on the particular acid, the particular curing agent and curing rate and pot life desired. Generally, the acid is present in an amount of about 1 to 10 weight percent based on the solids of coating composition.

The curable coating compositions of this invention are suitable for application to heat sensitive substrates such as hardboard, plywood, plastics and paper since they are capable of curing at low temperatures which do affect these substrates e.g., 60°–70° C. Of course, higher temperatures appropriate for the particular substrate can be used and lower temperatures can be used with longer cure times.

Since the compositions of this invention permit the inclusion of substantial amounts of water they are particularly advantageous in applications where organic volatile emissions to the environment are a concern.

The present invention is illustrated by the following non-limiting examples.

EXAMPLE 1

This example illustrates the preparation of poly-(hydroxyethyl methacrylate).

A two liter round bottom flask was charged with 232 grams of deionized water and 232 grams of reagent grade methanol. Two and one-half grams of ammonium persulfate were added to this solution prior to a 15 minute subsurface purge with nitrogen. After heating to 70° C., in a nitrogen atmosphere, a mixture of 250 grams of hydroxyethyl methacrylate and 2.5 grams of n-octyl mercaptan was added dropwise over a one hour period. The reaction was held for an additional two hours at 70° C. prior to discharge. The resulting product had a pH of 2.6 and a Brookfield viscosity of 255 centipoise. The reduced specific viscosity of this poly-(hydroxyethyl methacrylate) sample was found to be 0.16 when determined in a propylene glycol-water-methanol mixture. The conversion of monomer to polymer was found to be complete by drying a sample for 24 hours in a vacuum oven at 56° C.

EXAMPLE 2

This example illustrates the preparation of coatings with poly-(hydroxyethyl methacrylate) and an aminoplast curing agent.

A typical coating formulation was prepared by blending 22.9 grams of above poly-HEMA dispersion with 2.0 grams of Tetronic 1502*and 10.0 grams of Cymel 303** and reducing the total solids to 33.3% by adding 8.6 grams of methanol and 16.6 grams of deionized water. This formulation was then catalyzed with 4.0 grams of a 50% solution of p-toluene sulfonic acid in water which afforded a product with approximately 23 hours pot life. The following dry film properties were obtained on prefinished hardwood plywood upon curing the film during 15 seconds under infrared radiation to achieve approximately 60°–66° C. (140°–150° F.) board surface temperature:

Hot Mar Resistance: Excellent
Adhesion: Fair-Good
MEK double rubs: 10
Water double rubs: 50

*Tetronic 1502 is a condensate of ethylene diamine and ethylene oxide and propylene oxide.
**Cymel 303 is a methylated melamine formaldehyde available from American Cyanamid.

We claim:

1. Stable aqueous dispersions comprising at least 15 weight percent of poly-(hydroxyethyl methacrylate) homopolymer based on the total composition, in a solvent mixture consisting essentially of water and a water miscible lower alkanol in which water comprises at least about 40 weight percent of the solvent mixture and the lower alkanol comprises at least about 30 weight percent of the solvent mixture.

2. The stable aqueous dispersion of claim 1 comprising at least about 20 weight percent of poly-(hydroxyethyl methacrylate) homopolymer.

3. The stable aqueous dispersion of claim 1 comprising at least 30 weight percent of poly-(hydroxyethyl methacrylate) homopolymer.

4. The stable aqueous dispersion of claim 1 in which said lower alkanol is methanol, ethanol or isopropanol.

5. The stable aqueous dispersion of claim 1 in which said lower alkanol is methanol.

6. The stable aqueous dispersion of claim 1 comprising at least about 30 weight percent of poly-(hydroxyethyl methacrylate) homopolymer in a solvent mixture consisting essentially of water and methanol.

7. A coating composition comprising the stable aqueous dispersion of claim 1 and an aminoplast curing agent in an amount sufficient to produce a hard coating upon heat curing.

8. The coating composition of claim 7 in which said aminoplast is a melamine-formaldehyde condensate.

9. The coating composition of claim 7 containing an acid curing catalyst.

10. A method of coating a heat sensitive substrate of wood, paper or plastic, comprising applying the composition of claim 9 and curing to a hard film at a temperature sufficient to effect cure but insufficient to affect the substrate.

* * * * *

UNITED STATES PATENT AND TRADEMARK OFFICE
CERTIFICATE OF CORRECTION

PATENT NO. : 4,382,984
DATED     : May 10, 1983
INVENTOR(S) : Carlos Martinez and Michael A. Tobias It is certified that error appears in the above-identified patent and that said Letters Patent is hereby corrected as shown below:

Title and Column 1, line 1, "Poly-(Hydroxymethyl Methacrylate) should read -- Poly-(Hydroxyethyl Methacrylate)--

Signed and Sealed this

Second Day of August 1983

[SEAL]

Attest:

Attesting Officer

GERALD J. MOSSINGHOFF

Commissioner of Patents and Trademarks